US006373592B1

(12) United States Patent
Ito

(10) Patent No.: US 6,373,592 B1
(45) Date of Patent: Apr. 16, 2002

(54) METHOD AND APPARATUS FOR GENERATING IMAGE FILE

(75) Inventor: Wataru Ito, Kanagawa-ken (JP)

(73) Assignee: Fuji Photo Film Co., Ltd., Minamishigara (JP)

( * ) Notice: Subject to any disclaimer, the term of this patent is extended or adjusted under 35 U.S.C. 154(b) by 0 days.

(21) Appl. No.: 09/111,859

(22) Filed: Jul. 8, 1998

(30) Foreign Application Priority Data

Jul. 8, 1997 (JP) ......................................... 182656/1997

(51) Int. Cl.⁷ .............................................. G06U 15/00
(52) U.S. Cl. ......................................... 358/1.2; 358/1.6
(58) Field of Search ...................... 358/1.2, 1.6, 1.9, 358/1.13, 1.15, 501, 525, 528, 532, 428, 447, 448, 451; 382/254, 255, 258, 276, 278, 279, 298, 299, 300, 302

(56) References Cited

U.S. PATENT DOCUMENTS

| | | | | |
|---|---|---|---|---|
| 5,048,111 A | | 9/1991 | Jones et al. .................. | 382/248 |
| 5,097,518 A | * | 3/1992 | Scott et al. .................. | 382/298 |
| 5,113,455 A | * | 5/1992 | Scott ........................... | 382/298 |
| 5,218,455 A | | 6/1993 | Kristy ......................... | 358/403 |
| 5,258,938 A | * | 11/1993 | Akamatsu .................... | 708/290 |
| 5,680,225 A | * | 10/1997 | Hirabayashi et al. ....... | 358/451 |
| 5,729,628 A | * | 3/1998 | Tokuyama ................... | 382/173 |
| 5,737,019 A | * | 4/1998 | Kim ............................ | 348/390 |
| 5,768,482 A | * | 6/1998 | Winter et al. ............... | 358/1.9 |
| 5,788,385 A | * | 8/1998 | Inoue et al. ................. | 400/279 |
| 5,937,147 A | * | 8/1999 | Ng .............................. | 358/1.9 |
| 6,002,429 A | * | 12/1999 | Ochi et al. .................. | 348/207 |
| 6,002,810 A | * | 12/1999 | Wakisawa et al. .......... | 382/298 |
| 6,026,215 A | * | 2/2000 | Fantone et al. ............. | 358/1.2 |

FOREIGN PATENT DOCUMENTS

| | | |
|---|---|---|
| JP | 589238 | 4/1993 |
| JP | 1073921 A | 3/1998 |

OTHER PUBLICATIONS

Blumberg et al., "Visual Realism and Interactivity for the Internet," Proceedings of IEEE Compcon, US, Los Alamitos, IEEE Comp. Soc. Press, pp. 269–273, XP000751797m ISBN: 0–8186–7805–4, Feb. 23, 1997.

S.K. Chang, et al., "A Generalized Zooming Technique for Pictorial Database Systems," AFIPS Conf. Proc., vol. 48, Jun. 4–7, 1979, pp. 147–156, XP0002124217.

P.G. Burt, et al., "The Laplacian Pyramid as a Compact Iamge Code," IEEE Transactions on Communications, US, IEEE Inc., New York, vol. COM 31, No. 4, pp. 532–540, XP0000570701, ISSN: 0090–6778.

* cited by examiner

Primary Examiner—Gabriel Garcia

(57) ABSTRACT

Upon generating a plurality of image data sets at different resolutions from a digital image data obtained by a film scanner or the like and recording the data sets in a recording medium as an image file having a hierarchy such as the one defined by the FlashPix standard, image quality degradation caused in generation processing of the image data sets at different resolutions can be minimized. Image data for printing is generated in order to generate photographic print by carrying out interpolation processing by an interpolation processing device (printing image data generating device) on an original image obtained by an image obtaining apparatus. Image data sets at different resolutions are also generated by directly carrying out interpolation processing by an interpolation processing device (stepping resolution image data set generating device) on the original image.

6 Claims, 3 Drawing Sheets

METHOD AND APPARATUS FOR GENERATING IMAGE FILE

BACKGROUND OF THE INVENTION

Field of the Invention

The present invention relates to an image file generating method and apparatus which is used upon recording a digital image obtained from a film or a digital camera as an image file in a recording medium such as a CD-R and an MO disc.

A digital output service has been carried out wherein a digital image read from a film is recorded in a photo CD, an MO disc or the like and provided to a customer. In the FlashPix standard proposed by Eastman Kodak Co., a structured storage file comprising a storage and a stream including image data and various kinds of property information thereof has been defined as an image file format appropriate for a digital output service regarding photographs.

A digitally output photograph is used for appreciation by displaying it on a monitor and for generating additional print afterwards. On this occasion, the resolution appropriate for printing is generally different from that appropriate for monitor display. Furthermore, in the case of a monitor, the resolution necessary for display varies depending on the size of a monitor screen. Therefore, an image file defined by the FlashPix standard has a plurality of image data sets at different resolutions.

A digital output service such as the above is often used in combination with printing service when a film is deposited for development, for example. Therefore, as a system for smoothly operating such a service, Fuji Photo Film Co. Ltd. has proposed a photograph finishing system which carries out both generation of photographic print and output in a recording medium at one-time film reading (see Japanese Unexamined Patent No. 10(1998)-73921 and U.S. Ser. No. 08/974,888). In Japanese Unexaimined Patent Publication No. 10(1998)-73921 and U.S. Ser. No. 08/974,888, a system has been described which carries out output in a recording medium by using a file format based on the FlashPix standard.

More specifically, the above photograph finishing system carries out tone processing and color processing on a digital image obtained by a film scanner or a digital camera, and outputs print of the image after enlargement or reduction of the digital image in accordance with the print size and sharpness enhancing processing or the like carried out thereon. The photograph finishing system also converts the digital image after the sharpness enhancing processing into a file format based on the FlashPix standard and records the file in a recording medium.

In the FlashPix standard, four kinds of interpolation filters are defined which generate half-resolution image data from high resolution image data. Therefore, a digital image having been obtained is generally enlarged to the print size, and sequential interpolation processing is carried out on the image for printing by using the interpolation filters of the FlashPix standard. In this manner, image data at resolutions $1/2$, $1/4$, $1/8$, and $1/16$ of that of the original digital image are generated.

Quality of a digital image generally degrades by repeated enlargement or reduction processing. In other words, the smaller the number of repetition of enlargement or reduction processing, the better the quality is. However, in the above photograph finishing system, lower resolution image data are generated by repeated interpolation processing on high resolution image data generated for printing. Therefore, image data other than the ones for printing have experienced at least two times of interpolation processing.

SUMMARY OF THE INVENTION

Based on consideration of the problems described above, an object of the present invention is to provide a method and apparatus which minimizes image quality degradation due to enlargement or reduction of a digital image.

An image file generating method of the present invention generates image data for printing at a resolution appropriate for printing and image data sets at different resolutions changing stepwise and lower than the resolution of the image data for printing by using a digital image obtained by an image obtaining apparatus, and generates a structured storage file comprising the image data for printing and at least one of the image data sets at different resolutions as components of the image file. The image file generating method is characterized by that the image data for printing and at least one of the image data sets at different resolutions are generated by applying direct interpolation processing on the digital image.

The image obtaining apparatus including a cable interface and a memory card reader and the like to obtain an image from a film scanner or a digital camera. Furthermore, the image obtaining apparatus is meant to include a medium drive for reading a recording medium wherein a digital image has been recorded and communication equipment for receiving a digital image transferred via a network.

The print means high quality photographic print generated mainly by a photographic service provider. In other words, the resolution appropriate for printing means a resolution (for example, 1800×1000) high enough to generate high quality photographic print.

The image data sets at stepwise changing resolutions mean a combination of image data sets having resolutions $1/2$, $1/4$, $1/8$, and $1/16$ of the resolution of the digital image, for example.

The structured storage file has a hierarchy similar to a directory structure of a conventional file system. Each component composing the hierarchy can be dealt with by different kinds of application software. Since the structured storage is widely known as a technique used in the Component Object Model (COM) proposed by Microsoft Corp., detailed explanation is not provided here.

Upon interpolation processing, in the case of enlargement ratio equal to or larger than 2 or reduction ratio equal to or smaller than $1/2$, image quality cannot be maintained unless the length of an interpolation filter is extended. As a result, calculation load becomes heavy. Therefore, among the image data sets at different resolutions, image data sets at resolutions between $1/2$ and 2 times the resolution of the digital image may be generated by directly interpolating the digital image, and the image data sets at resolutions other than the above may be generated by applying stepping interpolation processing on the image data sets at the resolutions within the above range.

An image file generating apparatus of the present invention generates image data for printing at a resolution appropriate for printing and image data sets at resolutions changing stepwise and lower than the resolution of the image data for printing by using a digital image obtained by an image obtaining apparatus, and generates a structured storage file comprising the image data for printing and at least one of image data sets at different resolutions as components of the image file. The image file generating apparatus comprises printing image data generating means which generates the image data for printing by directly applying interpolation processing on the digital image, stepping resolution image data set generating means which generates at least one of the image data sets at different resolutions by applying direct interpolation processing on the digital image, and file generating means which generates the structured storage file by using the image data for printing and the image data sets at different resolutions.

According to the image file generating method and apparatus of the present invention, upon generating the image data sets at different resolutions, the image data sets are generated by directly applying interpolation processing on a digital image having been obtained, rather than applying stepping interpolation processing on data of a high resolution image having been enlarged for printing. Therefore, degradation of image quality due to repeated interpolation processing can be minimized.

Among the image data sets at different resolutions, if image data sets at resolutions between ½ and 2 times the resolution of the digital image are generated by directly interpolating the digital image, and the image data sets at resolutions other than the above are generated by applying stepping interpolation processing on the image data sets at the resolutions within the above range, problems such as increased calculation load due to longer filter length can be avoided.

DESCRIPTION OF THE PREFERRED EMBODIMENT

Figure 1:
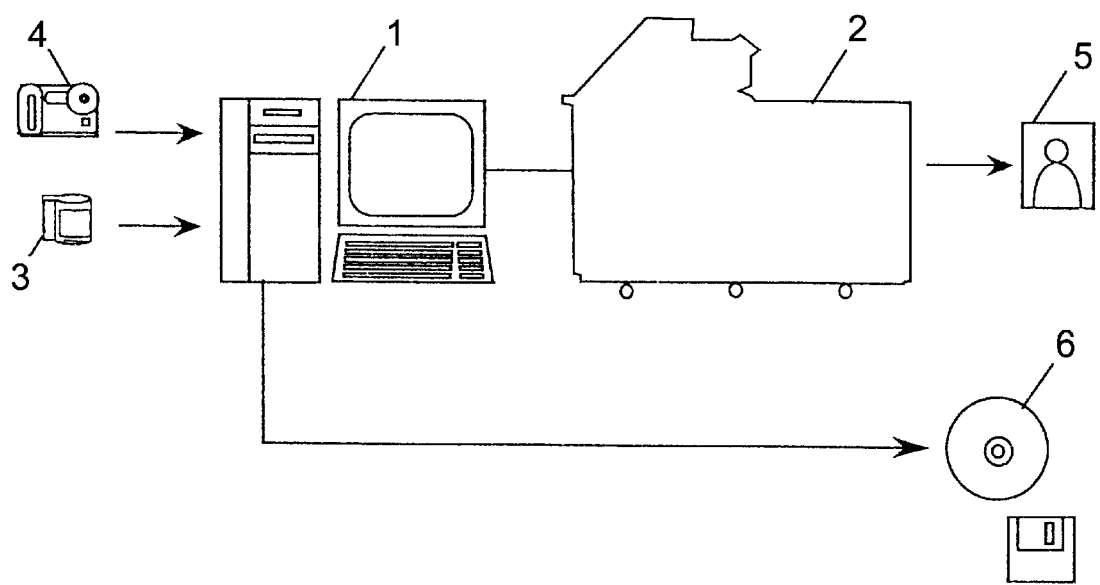
FIG. 1 is a diagram showing a configuration of a photograph finishing system on which an image file generating method of the present invention is applied.

Hereinafter, an image file generating method and apparatus of the present invention will be explained with reference to the accompanying drawings. FIG. 1 is a diagram showing a configuration of a photograph finishing system on which an image file generating method of the present invention is applied. As shown in this figure, this system comprises an image handling apparatus 1 and a photographic printer 2 connected to the image handling apparatus 1.

The image handling apparatus 1 is a general purpose personal computer wherein a dedicated program has been installed, for example. The image handling apparatus 1 comprises peripheral equipment or an interface for external equipment such as a film scanner for reading a developed film 3, a card reader for reading a memory card of a digital camera 4, or a cable interface for directly connecting to the digital camera. Furthermore, the image handling apparatus 1 comprises a medium drive for a CD-R, a Zip disc or the like, which is built in or connected externally. The image handling apparatus 1 also has communication equipment (not shown) for exchanging image data with other computers via a network.

The photographic printer 2 is a known digital photographic printer. The photographic printer 2 receives image data and output instructing information (for example, the quantity and the size of print) from the image handling apparatus 1 and outputs print based thereon.

In the above system, the image handling apparatus 1 carries out predetermined image processing on image data obtained from the developed film 3, and then transfers the image data to the photographic printer 2 and also records the image data in a recording medium 6 such as a CD-R. The image handling apparatus 1 can also accept photograph images input from a recording medium as well as from a scanner as printing targets. The recording medium may be the recording medium 6 wherein the image data have been recorded by this system, or a recording medium other than that.

Figure 2:
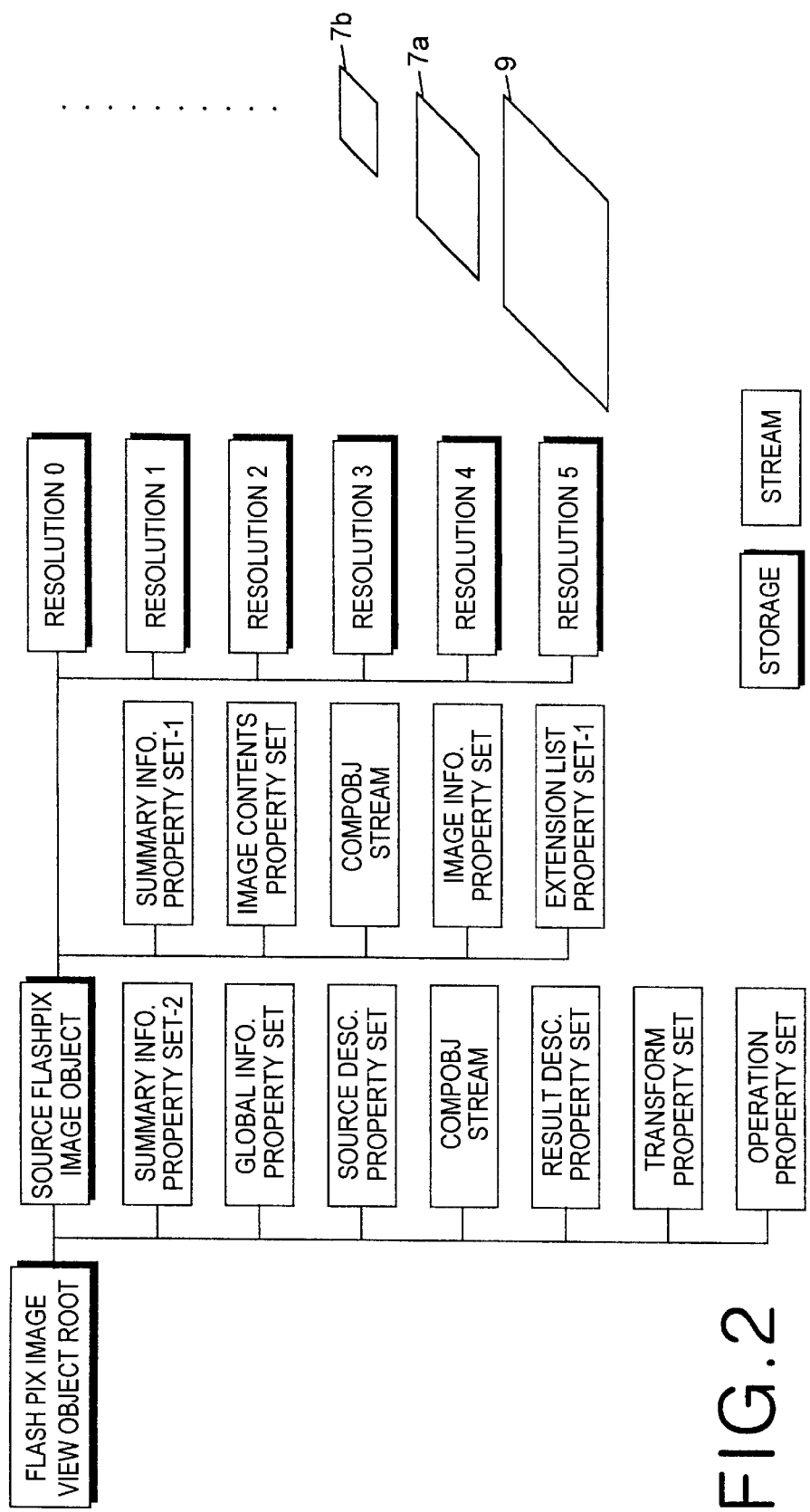
FIG. 2 is a diagram showing an image file format based on the FlashPix standard.

As a file format used upon recording a photograph image in a recording medium, a variety of formats such as BMP, TIFF, and GIF have been known. An image file generated by the file generating method of the present invention is a structured storage file comprising image data sets at different resolutions. A structured storage file specifically means a file having a hierarchy as shown in FIG. 2, and is defined in the FlashPix standard proposed by Eastman Kodak Co. The hierarchy shown in FIG. 2 shows a file as a whole. In storages Resolution0 through Resolution5, image data sets 7 at different resolutions are recorded as header streams for each image data set showing the number of pixels, a compression type, and the like thereof, and data streams which are the image data sets themselves. Other storages and streams shown in FIG. 2 are for recording various kinds of property information such as the date of image generation and the title of the image. Explanation of these is not provided here, since they are known as the FlashPix standard.

Hereinafter, an embodiment of an image file generating apparatus of the present invention will be explained with reference to FIG. 3. The image file generating apparatus of the present invention is actually realized as a function of a photograph finishing system having a configuration shown in FIG. 1.

Figure 3:
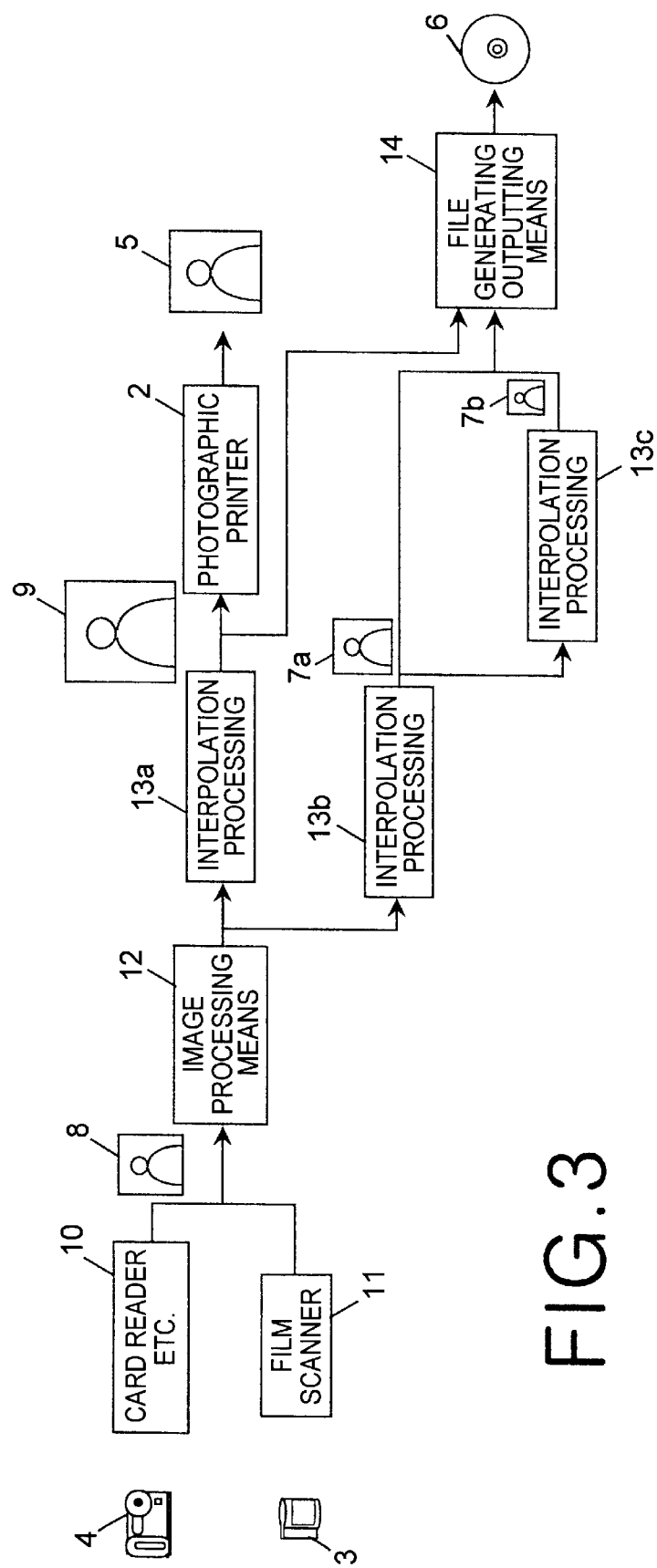
FIG. 3 is a diagram showing an embodiment of an image file generating apparatus of the present invention.

As shown in FIG. 3, image processing means 12 carries out various kinds of quality enhancing image processing such as color/tone conversion processing or sharpness enhancement processing on an original image 8 having been read from the developed film 3 by using a film scanner 11 or from a memory card of the digital camera 4 by using a card reader 10. Interpolation processing means 13a applies interpolation processing using a predetermined interpolation filter on the image having been processed, and image data 9 for printing are then generated. The image data 9 for printing are output by the photographic printer 2 as photographic print 5.

Assume that the original image 8 has 1000×1000 pixels and the image data 9 for printing having 1500×1500, resolution for example. In a conventional file generating method, the interpolation processing means 13a (printing image data generating means) applies interpolation enlargement on the original image 8 in order to generate the image data 9 for printing whose vertical and horizontal sizes are 1.5 times those of the original image 8. Interpolation processing by another interpolation filter is then carried out on the image data 9 for printing having 1500×1500 resolution, and a first image data set having 750×750 resolution and horizontal and vertical sizes which are ½ of those of the image data 9 is generated, for example. Furthermore, interpolation processing is carried out on the first image data set having 750×750 resolution, and a second image data set having 375×375 resolution is generated.

However, when interpolation processing is carried out, the sharpness generally decreases (generating a blurry image) and artifacts are created. Therefore, image quality degrades. Repeated interpolation processing means nothing but further degrading quality of a digital image which has already been in poor image quality. Therefore, to maintain image quality, it is preferable to minimize the repetition of interpolation processing as much as possible.

Therefore, in the image file generating method and apparatus of the present invention, image data sets at different resolutions to be recorded in a recording medium are generated from the original image 8 rather than from the image data 9 for printing. In other words, as shown in FIG. 3, interpolation processing means 13b (stepping resolution image data set generating means) carries out interpolation processing directly on a 1000×1000 image having been processed by the image processing means 12 and generates an image data set 7a at 750×750 resolution. In this case, the number of interpolation processing repetition necessary for generating the image data set at 750×750 resolution is smaller than in the conventional method by 1, which can suppress the image quality degradation.

Likewise, if an image data set 7b is generated by carrying out direct interpolation processing on the original image 8 after image processing having been carried out thereon, interpolation processing is not repeated. However, since the image data set 7b at 375×375 resolution has vertical and horizontal pixels fewer than ½ of those of the original image 8 at 1000×1000 resolution, interpolation processing maintaining image quality cannot be carried out unless the filter length is extended to some degree. Therefore, when processing speed is important, interpolation processing may be carried out in two manners. For example, if the image data set has the number of pixels equal to or larger than ½ of that of the original image 8 as shown in the example in FIG. 3, interpolation processing is carried out directly on the original image 8. Meanwhile, if smaller than ½, it is carried out on the image data set at a closer resolution obtained by previous interpolation processing, as has been carried out conventionally.

In the above example, each image data set is generated by reducing the original image 8. However, the image data sets 7 at different resolutions may be obtained by enlarging the original image 8. In this case, as in the case of the reduction described above, interpolation processing takes long if the number of pixels in horizontal or vertical direction of the image data set exceeds 2 times the number of those in the original image 8. Therefore, in order to reduce calculation load and to improve processing efficiency, interpolation processing may be carried out in two steps on the image data set at a resolution equal to or greater than two times the resolution of the original image 8, as has been carried out conventionally.

The image data sets 7 at different resolutions having been generated in the above manner are recorded by file generating outputting means 14 in a recording medium as an image file in a format shown in FIG. 2 together with various kinds of property information.

What is claimed is:

1. A method for generating an image file comprising:

obtaining digital image data having a resolution using an image obtaining apparatus;

generating a first image data set having a resolution appropriate for printing using direct interpolation processing on said digital image data;

generating a plurality of second image data sets having different resolutions, all of said different resolutions being lower than the resolution of said first image data set, said plurality of second image data sets including at least one image data set of a first type generated using direct interpolation processing on said digital image data; and generating a structured storage file containing said first image data set and at least one of said plurality of second image data sets.

2. The method for generating an image file as in claim 1, wherein said at least one image data set of the first type has a resolution between ½ and 2 times said resolution of said obtained digital image data, and wherein said plurality of second image data sets further includes at least one image data set of a second type generated using interpolation processing on said at least one image data set of the first type.

3. The method for generating an image file as in claim 2, wherein said at least one image data set of the second type has a resolution either less than ½ times or greater than 2 times said resolution of said obtained digital image data.

4. An apparatus for generating an image file comprising:

an image obtaining apparatus that obtains digital image data having a resolution;

a processor that directly interpolates said digital image data and generates a first image data set having a resolution appropriate for printing;

a processor that generates a plurality of second image data sets having different resolutions, all of said different resolutions being lower than the resolution of said first image data set, said plurality of second image data sets including at least one image data set of a first type generated using direct interpolation processing on said digital image data; and a processor that generates a structured storage file containing said first image data set and at least one of said plurality of second image data sets.

5. The apparatus for generating an image file as in claim 4, wherein said at least one image data set of the first type has a resolution between ½ and 2 times said resolution of said obtained digital image data, and wherein said plurality of image data sets having different resolutions further includes at least one image data set of a second type generated using interpolation processing on said at least one image data set of the first type.

6. The apparatus for generating an image file as in claim 5, wherein said at least one image data set of the second type has a resolution either less than ½ times or greater than 2 times said resolution of said obtained digital image data.

* * * * *